April 25, 1961    W. H. DEVONSHIRE    2,981,204
POWERIZED STORAGE RAIL FOR CONVEYOR SYSTEMS
Filed June 29, 1959    2 Sheets-Sheet 1

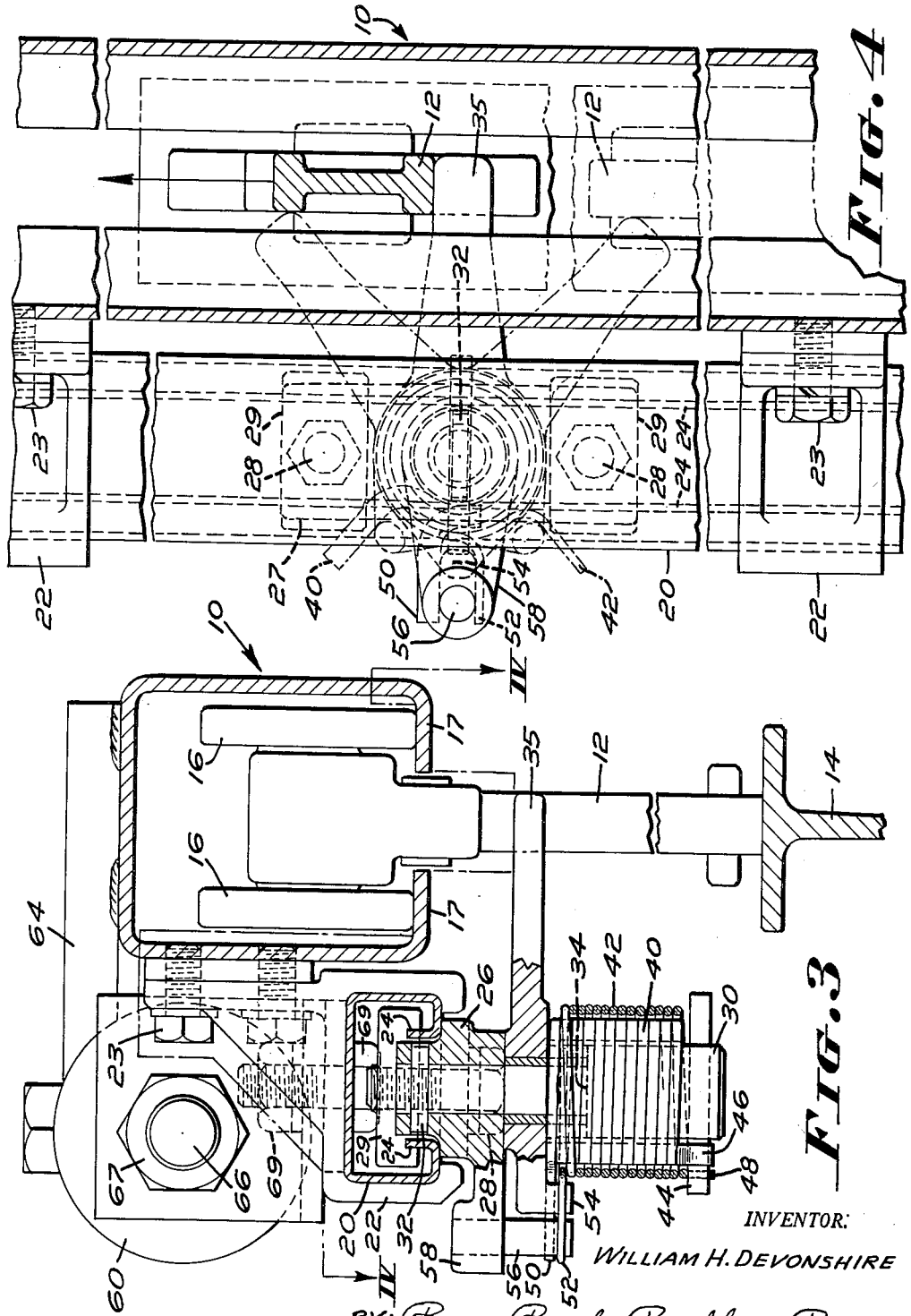

United States Patent Office 2,981,204
Patented Apr. 25, 1961

2,981,204

POWERIZED STORAGE RAIL FOR CONVEYOR SYSTEMS

William H. Devonshire, Williamsville, N.Y., assignor to Columbus McKinnon Chain Corporation, Tonawanda, N.Y.

Filed June 29, 1959, Ser. No. 823,732

7 Claims. (Cl. 104—162)

This invention relates to trolley conveyor systems, and more particularly for example to multiple track systems wherein trolleys periodically feed from branch tracks into the main conveyor lines. In such systems it is usually advantageous to provide "storage rail" sections in the branch track components just ahead of their positions of switching into the main line, whereby the load trolleys may accumulate while awaiting reentry into the main line of the conveyor system. The present invention relates more particularly to the type of trolley conveyor systems wherein the load trolleys run in "free tracks" parallel to which power chains are arranged to run with load pick up lugs extending therefrom at intervals to engage the load trolleys and to push or pull them along the branch and main line components of the conveyor system.

In such installations it is desirable to provide independent power supply means in connection with the "storage rail" portions of the system so as to provide the necessary flexibility of operation and to enable load trolleys entering the main line to do so without interference with other traffic moving through the main line, and thus to integrate therewith as opportunities occur. Or, in the alternative, the storage rail components of the system may be employed to accumulate batches of load trolleys which may be periodically fed into the main line whenever desired, as by means of a manually controlled power system. In any case it is desirable that the storage rail arrangement be so designed that incoming trolleys will move toward the discharge end thereof against a mechanical stop or the like, so as to accumulate therein in tandem arrangement whereby the full capacity of the storage rail section will be at all times available, and whereby the stored trolleys will be at all times ready for entry through a switch device into the main line.

It is an object of the present invention to provide an improved powerized storage rail arrangement for use in conjunction with a trolley conveyor system as explained hereinabove.

A more specific object is to provide a storage rail power supply mechanism which will be positive in its intended action for progressively displacing successive load trolleys into and forwardly through the power rail section toward the discharge end thereof, under various operating conditions such as are to be encountered.

Another object is to provide an improved power supply mechanism as aforesaid which automatically adjusts itself to varying available room conditions, so as to positively maintain under loaded condition the discharge end of the power rail section without jamming of the mechanism and/or interfering damages to the trolley devices.

Another object of the invention is to provide a structurally simple and otherwise improved mechanism for the purposes set forth hereinabove which will drive incoming trolleys to move into the available room in the storage rail component, and which will be sufficiently pliant to become inoperative when meeting resistances such as previously positioned trolleys; thereby preventing overloading of the system and/or failure of its operative parts.

Other objects and advantages of the invention will appear from the specification hereinafter, and the drawing herewith which illustrates by way of example one form of the invention, wherein:

Fig. 3 is a transverse sectional view, on enlarged scale, taken along line III—III of Fig. 2; and Fig. 4 is a section taken along line IV—IV of Fig. 3.

Figure 1:
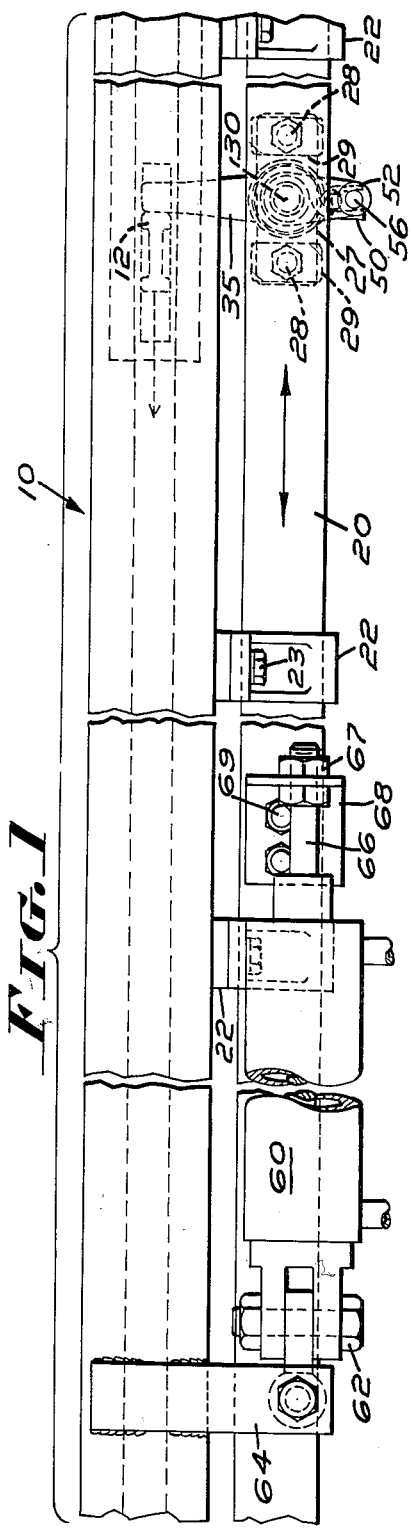
Fig. 1 is a fragmentary plan view of a portion of a storage rail and power supply component of a trolley conveyor system of the invention.
Figure 2:
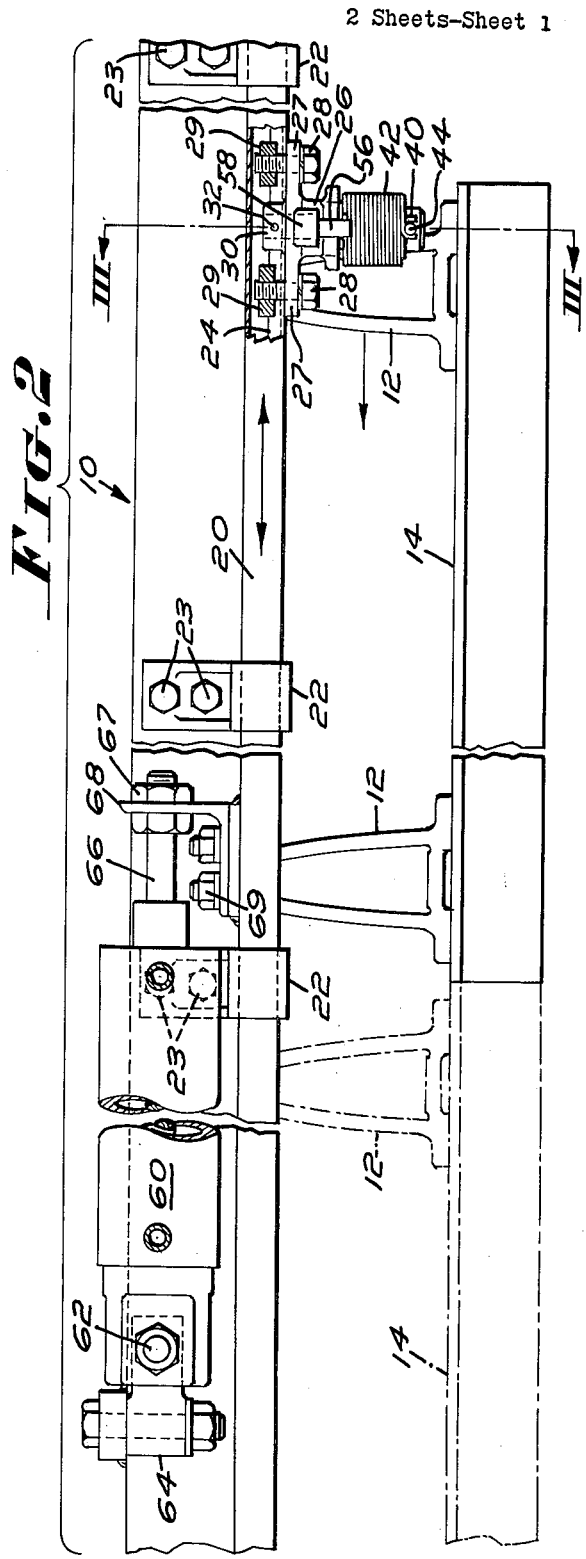
Fig. 2 is a side elevational view of the mechanisms of Fig. 1.

As shown in the drawing herewith, the invention is arranged in conjunction with a "storage rail" section of trolley trackway as indicated generally at 10, which as shown herein is of square tube form slotted through its bottom wall to accommodate suspension arms 12 supporting at their lower ends trolley bars 14 upon which are hung the loads to be carried. As their upper ends the suspension devices 12 carry trolley rollers 16, 16 (Fig. 3) which run on the bottom flanges 17, 17 of the track member 10; whereby the trolleys are mounted in "free running" relation on the trackway.

The mechanism for powering the load trolleys to progress through and towards the discharge end of the storage rail component 10 is illustrated herein to comprise a push-pull member or strut 20 which is mounted in parallel relation to the storage rail 10 by means of brackets 22 which are fixed to the storage rail 10 as indicated at 23. The push-pull member 20 is conveniently formed of square tubing, cutaway at its bottom surface and formed thereat with inwardly and upwardly turned flanges 24 (Fig. 3). The push-pull member 20 and the brackets 22 are sectionally shaped to complement one another whereby the push-pull member is longitudinally shiftable in the brackets 22.

At intervals therealong the push-pull member 20 is provided with downwardly extending trigger support brackets 26 having end flange portions 27, 27 carrying anchor bolts 28, 28 which screw-thread upwardly through cross arms 29, 29 which are notched and rest at their opposite ends on the top edges of the push-pull flanges 24, 24. Thus the trigger bracket 26 is firmly anchored to the push-pull member 20 to extend therebelow while clearing the bottom edges of the slide mount brackets 22. Each trigger bracket 26 is centrally bored vertically, to receive one end of a vertical shaft 30. The upper end of the shaft 30 is fixed to the bracket 26 as by means of a transverse pin 32 and is formed intermediately of its length with a shoulder portion 34 upon which bears the bottom flange of a trigger arm 35; the hub portion of the trigger arm being dimensioned to freely encircle the reduced portion of the vertical shaft 30 so as to be freely rotatable thereabout.

A pair of helical springs are concentrically mounted about the lower end portion of the shaft 30; comprising a relatively stiff coil spring 40 mounted interially of a relatively pliant coil spring 42. As shown in Fig. 3, the lower end of the shaft 30 is fitted with a transverse anchor pin 44; and the lower end of the stiff spring 40 is formed with an anchor tab portion 46 which engages one end of the pin 44, while the pliant spring 42 is also formed at its lower end with a tab portion 48 similarly engaging pin 44. Hence, the bottom ends of both springs are keyed to the shaft 30 and are thereby fixed with respect to the mechanism. At their upper ends the springs 40—42 terminate in radially turned end portions 50, 52, respectively, which curl first around opposite sides of a downturned finger portion 54 extending from the trigger arm 35, and thence into pretensioned bearing relation against opposite sides of an abutment pin 56 extending downwardly from a bracket portion 58 extending radially from the trigger bracket 26. The springs 40 and 42 are selected and arranged so as to be spiralled when viewed in top plan; one in clockwise direction and the other in counter-clockwise direction.

The springs 40, 42 are so arranged as to normally bias the trigger arm 35 to extend laterally in 90 degree relation (in plan view) away from the push-pull member 20, while being pliant (but to different degrees) so as to be adapted to "give" under certain conditions of operation to permit the trigger arm 35 to swing in either direction as shown in broken lines at Fig. 4, as will be explained hereinafter.

To power the push-pull member 20, any suitable device for reciprocating the latter relative to the trackway 10 may be employed. For example, as shown herein a pneumatic or hydraulic cylinder as indicated at 60 may be fixed as indicated at 62 to a bracket 64 extending in fixed relation from the trackway 10; the piston member 66 of the unit being attached by a nut 67 to a bracket 68 which is fixed to the push-pull member 20 as indicated at 69. Thus, it will be appreciated that reciprocation of the piston rod 66 in the cylinder 60 will cause corresponding reciprocatory movements of the push-pull member 20 in directions parallel to the length of the track section 10.

It is contemplated that the cylinder 60 will be controlled in its operation by some suitable manual or semi-automatic control arrangement (not shown) so that whenever it is desired to feed conveyor trolleys through the unit the cylinder 60 will be actuated to cause the strut member 20 to reciprocate, thereby alternately moving the trigger arms forwardly and rearwardly to engage and push forwardly any conveyor trolleys standing in the adjacent trackway 10 toward the discharge end of the storage section. Thus the concentric spring device is so arranged that when the trigger arms are being displaced forwardly by the push-pull member 20 the relatively stiff springs 40 will be "backing up" the trigger arms so as to give them sufficient stiffness to drive forwardly any conveyor trolleys so encountered. However, during reverse strokes of the strut member 20 the relatively pliant springs 42 are backing up the trigger arms of the mechanism; and are selected so as to freely give whenever under such conditions the trigger arms engage trolleys standing in the trackway.

Thus by means of this structurally simplified concentric spring arrangement the trigger arms are normally biased to extend at right angles from the strut member for driving connection with conveyor trolleys standing in associated trackway. However, if any conveyor trolley so engaged by the pusher mechanism is bearing against any obstruction, such as a line of load trolleys previously stored at the discharge end of the system, the relatively stiff springs will thereupon also "give" so as to permit the strut member to complete its cycle of operation without damage to the system.

Thus it will be appreciated that by virtue of this improved construction, a relatively simple and rugged and inexpensively fabricated mechanism is provided, which is positive yet fool-proof in its operation and free from tendencies to jam and/or to damage parts of the mechanism as explained hereinabove. Also, it will be appreciated that although only one specific form of the invention has been shown and described in detail herein, it will be understood that various changes may be made therein without departing from the spirit of the invention or the scope of the following claims.

I claim:

1. A powerized storage rail unit for use in conjunction with a conveyor trolley system, said unit including a storage track portion and a powerized storage track portion disposed therebetween, said powerized storage track portion including a free track section adapted to accommodate in tandem relation therein a plurality of conveyor trolleys, a trolley pusher device comprising a strut extending alongside and substantially parallel to said track section, means mounting said strut to be free to reciprocate in directions longitudinally of said track portion, power means coupled to said strut and operable to cause the latter to reciprocate relative to said track portion in response to control of said power means, trolley engagement means carried by said strut, said engagement means including an arm pivotally mounted upon said strut to extend laterally therefrom, relatively stiff spring means connecting said strut and said arm and operable to relatively stiffly bias said arm to remain laterally extended when said arm is bearing against a trolley standing in said storage track portion to move in the direction of intended advancement of said trolley, and relatively pliant spring means interconnecting said strut and said arm and arranged to relatively softly bias said arm to remain in extended position when the strut is moving in reverse direction, said pliant spring means being adapted to "give" whenever said arm comes in contact with a trolley during return motions of said strut.

2. A powerized storage rail unit for use in conjunction with a conveyor trolley system, said unit including a storage track portion and a powerized storage track portion disposed therebetween, said powerized storage track portion including a free track section adapted to accommodate in tandem relation therein a plurality of conveyor trolleys, a trolley pusher device comprising a member extending alongside and substantially parallel to said track section, means mounting said member to be free to reciprocate in directions longitudinally of said track portion, power means coupled to said member and operable to cause the latter to reciprocate relative to said track portion in response to control of said power means, trolley engagement means carried by said member, said engagement means including an arm pivotally mounted upon said member to extend laterally therefrom, relatively stiff spring means connecting said member and said arm and operable to relatively stiffly bias said arm to remain laterally extended when said arm is urging a trolley to move in the direction of intended advancement of said trolley, and relatively pliant spring means interconnecting said member and said arm and arranged to relatively softly bias said arm to remain at other times in extended position, said pliant spring means being adapted to "give" whenever said arm comes in contact with a trolley during return motions of said member.

3. A powerized storage rail unit for use in conjunction with a conveyor trolley system, said unit including a storage track portion adapted to accommodate in tandem relation therein a plurality of conveyor trolleys, a trolley pusher device comprising a strut extending alongside and substantially parallel to said track portion, means mounting said strut to be free to reciprocate in directions longitudinally of said track portion, power means coupled to said strut and operable to cause the latter to reciprocate relative to said track portion in response to control thereof, trolley engagement means carried by said strut, said engagement means including an arm pivotally mounted upon said strut to extend laterally therefrom, relatively stiff spring means connecting said strut and said arm and operable to relatively stiffly bias said arm to remain laterally extended when said arm is advancing and bearing against a trolley standing in said storage track portion, and relatively pliant spring means interconnecting said strut and said arm and arranged to normally center said arm to remain in extended position, said pliant spring means being adapted to "give" whenever said arm comes in contact with a trolley during return motions of said strut.

4. A powerized storage rail unit for use in conjunction with a conveyor trolley system, said unit including a storage track portion adapted to accommodate in tandem relation therein a plurality of conveyor trolleys, a trolley pusher device comprising a strut extending alongside and substantially parallel to said track section, means mounting said strut to be free to reciprocate in directions longitudinally of said track portion, trolley engagement means carried by said strut, said engagement means including a plurality of arms pivotally mounted upon said strut to extend laterally therefrom, relatively stiff spring means connecting said strut and said arms and operable to relatively stiffly bias said arms to remain laterally extended when said arms are urging trolleys to move in said storage track portion in the direction of intended advancement of said trolleys, and relatively pliant spring means interconnecting said strut and said arms and arranged to relatively softly bias said arms to remain in centered extended positions, said pliant spring means being adapted to "give" whenever said arms come in contact with trolleys during return motions of said strut.

5. A powerized storage rail unit for use in conjunction with a conveyor trolley system, said unit including a powerized storage track portion including a free track section adapted to accommodate in tandem relation therein a plurality of conveyor trolleys, a trolley pusher device comprising a strut extending alongside and substantially parallel to said track section, means mounting said strut to be free to reciprocate in directions longitudinally of said track portion, power means coupled to said strut and operable to cause the latter to reciprocate relative to said track portion in response to control thereof, trolley engagement means carried by said strut, said engagement means including arms pivotally mounted upon said strut to extend laterally therefrom, relatively stiff spring means connecting said strut and said arms and operable to relatively stiffly bias said arms to remain laterally extended when said arms are urging trolleys to move in the direction of intended advancement of said trolleys, and relatively pliant spring means interconnecting said strut and said arms and arranged to relatively softly bias said arms to remain in centered extended positions while being adapted to "give" whenever said arms come in contact with trolleys during return motions of said strut, said stiff springs and said pliant springs being arranged in concentrically paired relation in connection with each of said arms.

6. A powerized storage rail unit for use in conjunction with a conveyor trolley system, said unit including a free track section adapted to accommodate in tandem relation therein a plurality of conveyor trolleys, a trolley pusher device comprising a member extending alongside and substantially parallel to said track section, means mounting said member to be free to reciprocate in directions longitudinally of said track portion, power means coupled to said member and operable to cause the latter to reciprocate relative to said track portion in response to control of said power means, trolley engagement means carried by said member, said engagement means including an arm pivotally mounted upon said member to extend laterally therefrom, a relatively stiff helical spring connecting said member and said arm and operable to relatively stiffly bias said arm to remain laterally extended when said arm is urging a trolley to move in the direction of intended advancement of said trolley, and a relatively pliant helical spring mounted concentrically of said stiff spring and interconnecting said member and said arm and arranged to relatively softly bias said arm to remain at other times in extended position, said pliant spring means being adapted to "give" whenever said arm comes in contact with any obstruction during return motions of said member.

7. A powerized storage rail unit for use in conjunction with a conveyor trolley system, said unit including a free track section adapted to accommodate in tandem relation therein a plurality of conveyor trolleys, a trolley pusher device comprising a member extending alongside and substantially parallel to said track section, means mounting said member to be free to reciprocate in directions longitudinally of said track section, trolley engagement means carried by said member, said engagement means including an arm pivotally mounted upon said member to extend laterally therefrom, a relatively stiff coil spring interconnecting said member and said arm and operable to relatively stiffly bias said arm to remain laterally extended when said arm is urging a trolley to move in the direction of intended advancement of said trolley, and a relatively pliant coil spring mounted concentrically of said stiff spring and interconnecting said member and said arm and arranged to relatively softly bias said arm to remain at other times in extended position.

References Cited in the file of this patent
UNITED STATES PATENTS

| | | |
|---|---|---|
| 1,742,789 | Simpson | Jan. 7, 1930 |
| 2,161,388 | Rosenthal | June 6, 1939 |

FOREIGN PATENTS

| | | |
|---|---|---|
| 671,565 | Germany | Feb. 9, 1939 |